US012618597B2

(12) United States Patent
Tiefel et al.

(10) Patent No.: US 12,618,597 B2
(45) Date of Patent: May 5, 2026

(54) SYSTEM AND METHOD FOR RAPIDLY PRINTING ICE INTO A THREE-DIMENSIONAL STRUCTURE

(71) Applicant: KorPrinters LLC, Siloam Springs, AR (US)

(72) Inventors: Simeon E. Tiefel, Siloam Springs, AR (US); Daniel Lamet, Tigard, OR (US)

(73) Assignee: Korprinters LLC, Siloam Springs, AR (US)

( * ) Notice: Subject to any disclaimer, the term of this patent is extended or adjusted under 35 U.S.C. 154(b) by 65 days.

(21) Appl. No.: 18/662,970

(22) Filed: May 13, 2024

(65) Prior Publication Data

US 2025/0347458 A1      Nov. 13, 2025

(51) Int. Cl.
*F25C 1/12*          (2006.01)
*B33Y 10/00*        (2015.01)
*B33Y 30/00*        (2015.01)

(52) U.S. Cl.
CPC ................ *F25C 1/12* (2013.01); *B33Y 10/00* (2014.12); *B33Y 30/00* (2014.12)

(58) Field of Classification Search
CPC ........... F25C 1/12; B33Y 10/00; B33Y 30/00
USPC ......................................... 264/28
See application file for complete search history.

(56) References Cited

U.S. PATENT DOCUMENTS 5,088,047 A  *  2/1992  Bynum ............... G03F 7/70416
                                                              700/118
5,810,988 A      9/1998  Smith, Jr. et al.

| | | | |
|---|---|---|---|
| 6,253,116 B1 * | 6/2001 | Zhang .................... B33Y 10/00 |
| | | | 700/123 |
| 11,584,006 B2 | 2/2023 | Rubinsky et al. |
| 11,584,066 B2 | 2/2023 | Rubinsky et al. |
| 11,724,006 B2 | 8/2023 | Béduer et al. |
| 2010/0291176 A1 | 11/2010 | Chian et al. |
| 2013/0075013 A1 | 3/2013 | Chillscyzn et al. |
| 2017/0343263 A1 | 11/2017 | Liao |
| 2018/0168179 A1 | 6/2018 | Mantell et al. |
| 2018/0326660 A1 * | 11/2018 | Gifford ................. B29C 64/241 |

FOREIGN PATENT DOCUMENTS

| | | |
|---|---|---|
| CN | 104985116 B | 10/2017 |
| CN | 106178110 B | 6/2019 |
| ES | 2901240 T3 | 3/2022 |

* cited by examiner

*Primary Examiner* — Abbas Rashid
*Assistant Examiner* — Gregory C. Grosso
(74) *Attorney, Agent, or Firm* — LaMorte & Associates P.C.

(57)          ABSTRACT

A 3D printing system for producing an object from ice. Precooled water is directed into dispensing heads. The dispensing heads produce bands of water in patterns that are governed by a 3D model. The water droplets come into contact with an actively cooled transfer surface. The water bands partially freeze and adhere to the transfer surface. The transfer surface is on a track, belt, or drum that moves the partially frozen water bands into positions for use. The transfer surface is connected to a positioning system that can move the transfer surface and the semi-frozen bands of water. The positioning system moves the transfer surface causing the bands of water to be brought into contact with a surface of the object being formed. Upon contact with the object being formed, the bands of water fully freeze into ice bands that adhere to the object being formed.

9 Claims, 11 Drawing Sheets

23

22

20

11

SYSTEM AND METHOD FOR RAPIDLY PRINTING ICE INTO A THREE-DIMENSIONAL STRUCTURE

BACKGROUND OF THE INVENTION

1. Field of the Invention

In general, the present invention relates to 3D printing techniques that utilize water-based ice as the printing medium. The present invention also relates to the structure and operational methodology of 3D printing systems where a printing head prints onto a transfer surface that then physically moves the printed material to the object being printed.

2. Prior Art Description

In traditional 3D printing systems, moving print heads selectively deposit layers of printing material atop one another to form a three dimensional object. The printing material being deposited is typically a polymer compound that cures shortly after being exposed to air and/or light. Due to the viscosity of the printing material and the capacity of the printing heads, 3D printing systems are typically only utilized to produce parts that have a volume of less than one liter. Furthermore, 3D printing is notoriously slow. As such, the printing of large objects takes much longer than does the printing of small objects. In addition, the deposit rate of a 3D printing process is typically inversely proportional to the printing resolution. As a result, 3D printed parts that have a high resolution take much longer to print. Accordingly, printing a single large object at a high resolution using commercially available 3D printers can take many hours, if not many days.

Although traditional 3D printing techniques offer many advantages over manufacturing by machining, it also has many drawbacks. Only a limited number of materials can be used in 3D printers. Furthermore, when printing with traditional 3D printers, only specific materials that are compatible with the printing machine can be used. Often, printing different materials requires using different printing machines, or at least different printing heads. This makes it very difficult to 3D print any object that has layers of different materials or is otherwise non-homogenous. Furthermore, many commonly used manufacturing materials, such as polymer foams, cannot be used in a 3D printer. Such materials tend to expand as they cure, therein jamming printer heads and distorting the resolution of deposited materials.

In many circumstances, it is desirable to make a part from polymer foam, or similar materials. Such materials cannot be easily 3D printed using conventional equipment. In such circumstances, a custom mold is typically made and the desired part is a cast in the mold. Often the mold is used only for a single casting. If the part being made is small, it may be possible for the mold itself to be made on a traditional 3D printer. However, for larger objects, such as architectural pieces and construction components, the model must be made using traditional techniques. This makes the use of a custom mold not economical, especially if the mold is only going to be used once.

In theory, one of the best materials to build a single-use mold is water ice. Water is extremely inexpensive. Furthermore, any mold made from ice produces no waste after use. Rather, the mold merely melts away in an environmentally beneficial manner. The primary reason that ice molds are not used is due to the complexity of production. Water can be run through the printing head of a 3D printer. However, the printed water does not cure. Rather, the water must be frozen into ice at the moment it is printed. One way to do this is to print the water into a cryogenic fluid, such as is disclosed in U.S. Pat. No. 11,584,066 to Rubinsky. However, using cryogenic fluids is expensive, complicated, dangerous, and expensive. In addition, many cryogenic fluids require pressurized atmospheres in order to be stable. Otherwise, the cryogenic fluid will agitate and boil, therein disturbing the part being printed.

Another way to 3D print water is to spray the water onto a cooled surface in successive layers. The water is sprayed onto a cooled surface to keep the printing head separated from the cooled surface. This keeps the printing head from freezing and becoming clogged. Such a process is disclosed in Chinese Patent No. CN104985116. The problem with such a system is that the spraying of water onto a surface is a low resolution deposition process. As a consequence, parts produced by spray deposition have low resolution and tend to have imprecise tolerances. Furthermore, spraying techniques often require the use of baffles and surface masks to prevent spray from inadvertently being deposited where it is not wanted. Thus, water spraying techniques are typically only used to make generalized shapes that have no fine details, surface texturing or other features that require a high resolution.

A need therefore exists for an improved system and method for 3D printing ice that does not require the use of cryogenic materials. A need also exists for an improved system and method of 3D printing ice that can be used to form large objects, such as ice molds for architectural features and construction elements. Lastly, a need exists for an improved system and method of 3D printing ice where extremely fine details can be formed into the 3D object being made. These needs are met by the present invention described and claimed below.

SUMMARY OF THE INVENTION

The present invention is a 3D printing system for producing an object from ice. Water or a water-based mixture is filtered and precooled to near freezing. The precooled water is directed into a plurality of dispensing heads. The dispensing heads produce bands of water that can be as small as a single droplets. The bands of water are produced in patterns that are governed by a 3D model programmed into a controller. The water bands come into contact with a transfer surface as they are formed. The transfer surface is actively cooled. When the water bands contact the transfer surface, the water partially freezes and adhere to the transfer surface.

The transfer surface is on a track, belt, or drum that can move the partially frozen water bands away from the dispensing heads and into positions for use. The transfer surface that is holding the semi-frozen bands of water is connected to a positioning system that can move the transfer surface and the semi-frozen bands of water in the X-Y-Z axes. The positioning system moves the transfer surface relative to the object being formed. As the positioning system moves the transfer surface, the bands of water are brought into contact with a surface of the object being formed. Upon contact with the object being formed, the bands of water fully freeze into ice that adheres to the object being formed. As a result, precise patterns of ice are deposited, therein creating a high resolution layer on the object being formed. Layer upon layer are deposited until the object being formed is complete. Resolution can be as fine as a single droplet of water.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention 3D ice printing system can be embodied in many ways, only a few exemplary embodiments are illustrated and described. The exemplary embodiments are being shown for the purposes of explanation and description. The exemplary embodiments are selected in order to set forth some of the best modes contemplated for the invention. The illustrated embodiments, however, are merely exemplary and should not be considered as limitations when interpreting the scope of the appended claims.

Figure 1:
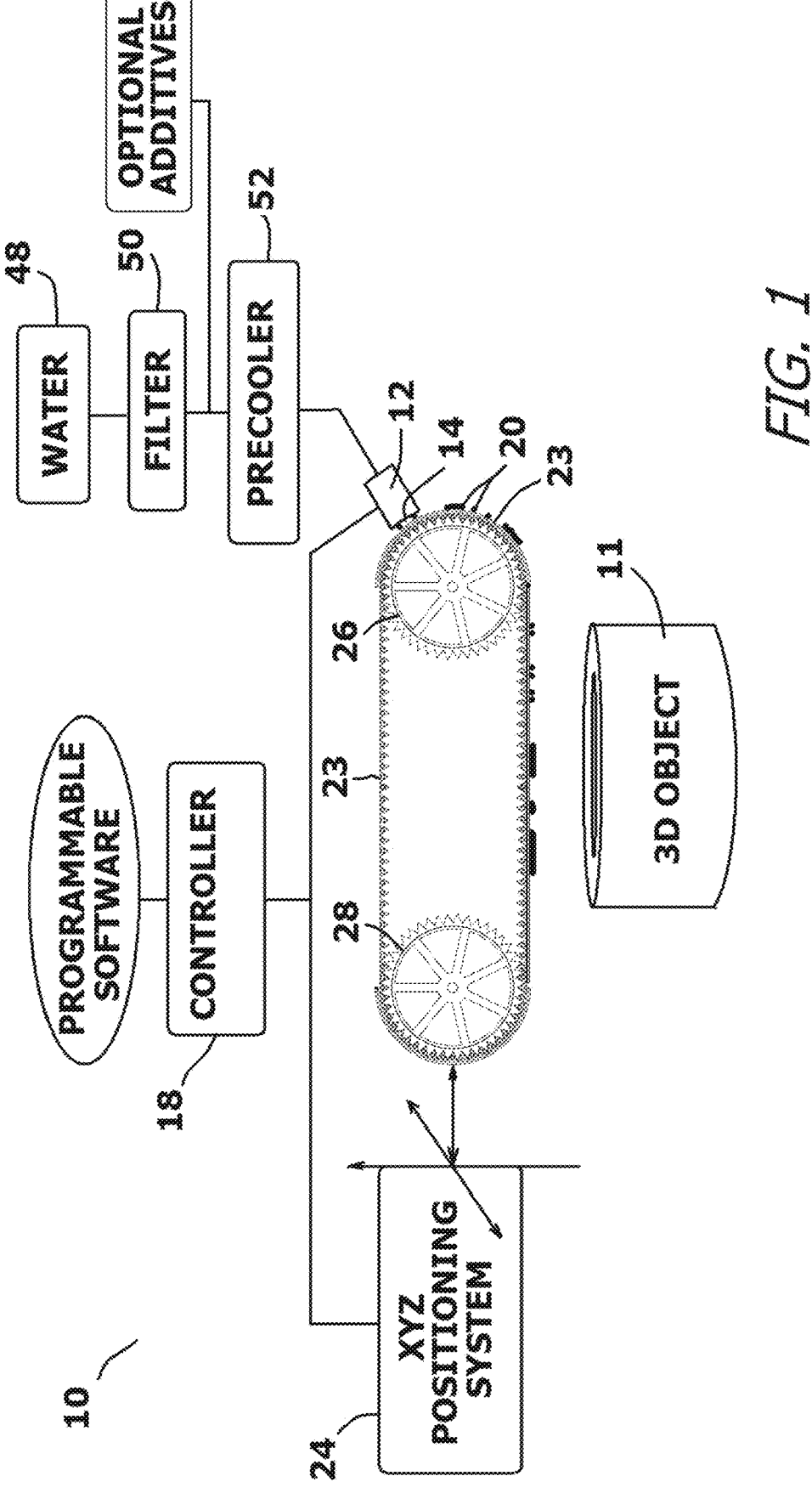
FIG. 1 shows an overview of an exemplary embodiment of a 3D ice printing system.

Referring to FIG. 1, an overview of a full 3D ice printing system 10 is shown. By way of example, the ice printing system 10 being illustrated is being used to create a 3D object 11 that is shown as a high resolution mold. The production of a mold is merely exemplary, and it should be understood that the 3D ice printing system 10 can be used to produce any 3D object 11 that can be modeled and fits within the size limitations of the system.

The 3D ice printing system 10 has at least one array 12 that contains one or more dispensing heads 14. Each dispensing head 14 is engineered to precisely produce a band of water 20 as controlled by the operational software 16 in a programmable controller 18. In this manner, the array 12 produces bands of water 20 in a highly precise pattern as governed by the operational software 16. As will later be explained in more detail, the bands of water 20 are produced just above the freezing temperature of water or at the freezing temperature of water but containing the latent heat of fusion. The bands of water 20 are dispensed directly onto a transfer surface 22 that is actively cooled. The bands of water 20 instantly begin to freeze and adhere to the transfer surface 22. The transfer surface 22 lowers the temperature of the bands of water 20 to 0° C. and removes the latent heat of fusion to begin ice crystallization. In the time period that the latent heat of fusion is being removed, the transfer surface 22 reorients the bands of water 20 to face in the direction of the 3D object 11 being formed. The transfer surface 22 is selectively moved to bring the bands of water 20 into contact with the 3D object 11 being created. Movement of the transfer surface 22 relative to the 3D object 11 is controlled, in part, by an x-y-z positioning system 24 that is also controlled by the programmable controller 18.

Each band of water 20 can be as long as the transfer surface 22 or as small as a single droplet. As the semi-frozen bands of water 20 contact the 3D object 11, the bands of water 20 freeze solid and become part of the 3D object 11. The transfer surface 22 rotates away from the 3D object 11, therein detaching the bands of water 20 from the transfer surface 22. The process is repeated until the 3D object 11 is created with layer upon layer of ice.

Figure 2:
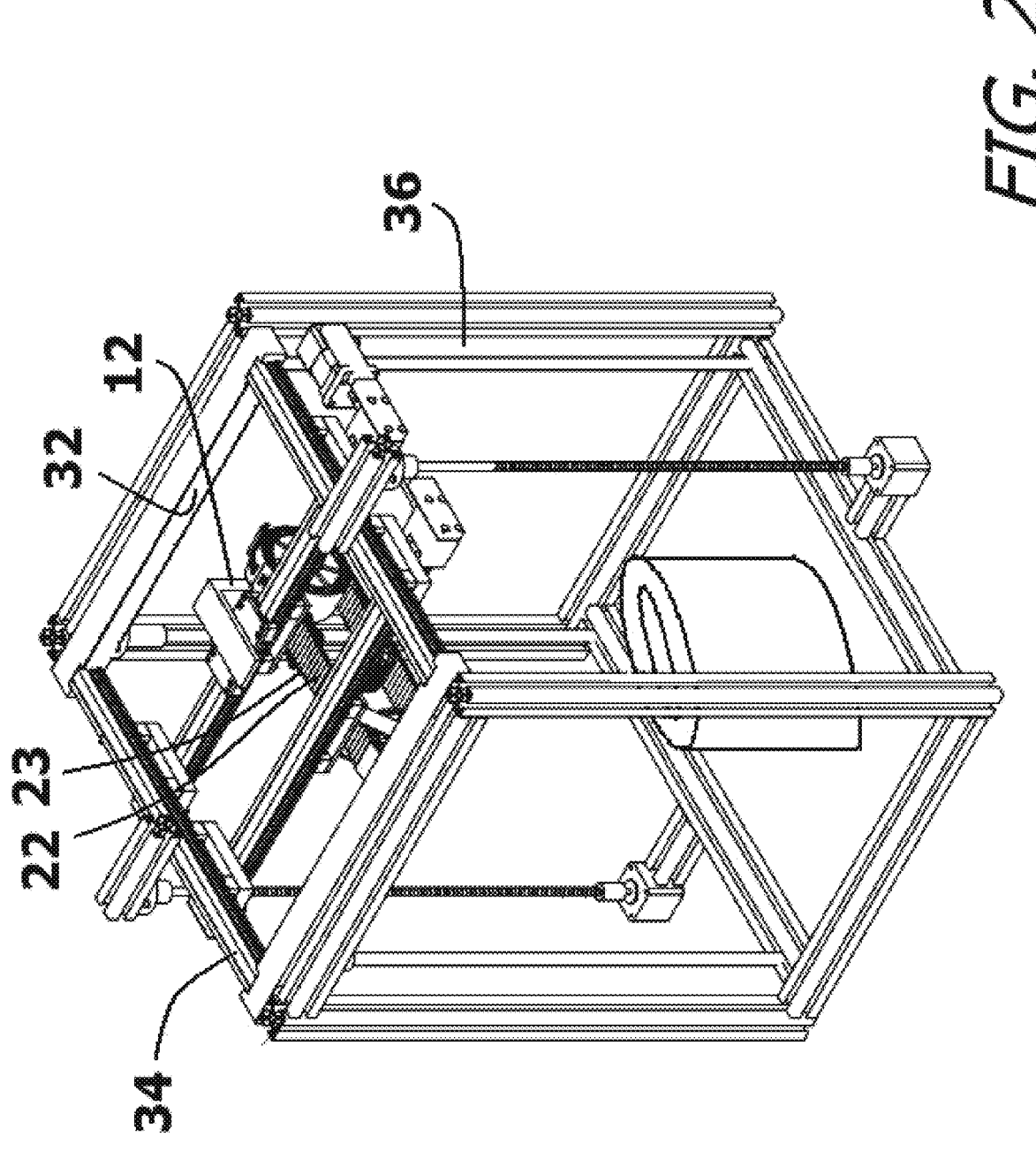
FIG. 2 shows the transfer track and an array of dispensing heads contained within an x-y-z positioning system.

Referring to FIG. 1 in conjunction with FIG. 2, it can be seen that the droplets of water are discharged from the array 12 that contains the dispensing heads 14. Depending upon the duration of the discharge, bands of water 20 of selective lengths can be formed. The bands of water 20 can be as small as a single droplet. The dispensing heads 14 are located in close proximity to the transfer surface 22. In the shown embodiment, the transfer surface 22 is a surface on a transfer track 23. The transfer surface 22 is made from copper, a copper alloy, or some other alloy with a high degree of heat conductivity. The transfer surface 22 is actively cooled, as is later explained. The transfer track 23 is looped around support rollers 26, 28 that repeatedly bring different areas of the transfer surface 22 under the output of the dispensing heads 14.

The array 12 of dispensing heads 14 and the transfer track 23 are mounted as a unit in the x-y-z positioning system 24. The x-y-z positioning system 24 is controlled by the programmable controller 18. The array 12 and transfer track 23 can be moved in the x-axis on a first set of rails 32, in the y-axis on a second set of rails 34, and in the z-axis on a third set of rails 36, by using various stepper motors 38. The stepper motors 38 are selectively operated by the programmable controller 18. In this embodiment, the 3D object 11 is stationary and the dispensing heads 14 and the transfer track 23 move. This embodiment is preferred. However, it will be understood that an opposite configuration can be produced where the 3D object 11 is set on a moving platform and the transfer track and dispensing heads remain stationary. What is of importance is that there is relative movement between the 3D object 11 and the transfer track 23 that can be precisely controlled by the programmable controller 18.

Figure 3:
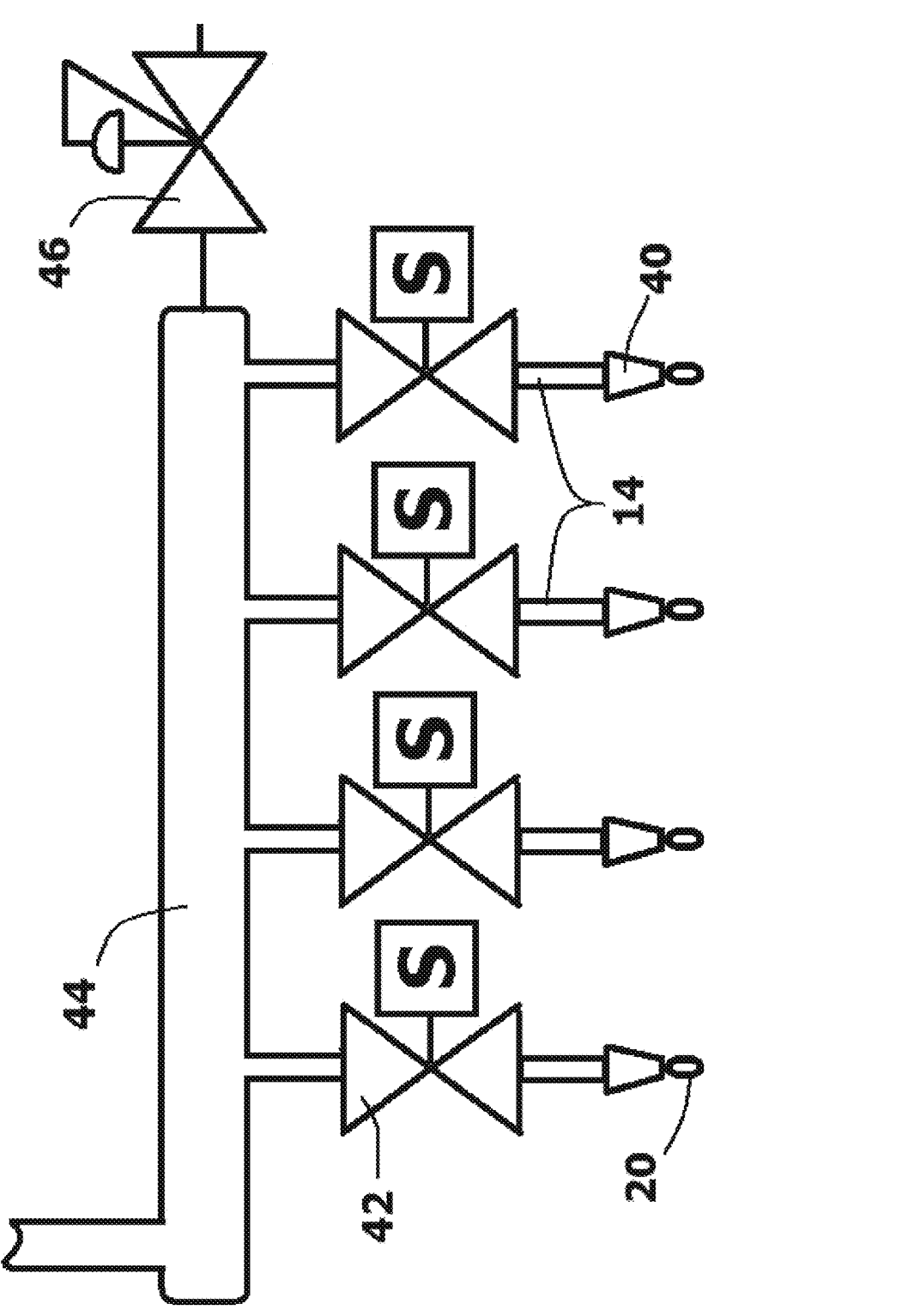
FIG. 3 is a schematic showing the structure of the dispensing head array.

Referring to FIG. 3 in conjunction with FIG. 1, it can be seen that dispensing heads 14 contain nozzles 40 that are sized to dispense bands of water 20. Each nozzle 40 is connected to a solenoid valve 42 that can control the flow of water to each nozzle 40. Each solenoid valve 42 is selectively operated by the programmable controller 18. The solenoid valves 42 receive water from a supply manifold 44. A pressure regulator 46 is provided to ensure that the pressure of the water fed through each solenoid valve 42 is the same each time the solenoid valve 42 operates. The supply manifold 44 receives water from a water reservoir 48. The water can be pure water, tap water, or a water solution, wherein additives are intentionally added to the water. The additives can be compounds, such as calcium chloride that raise the melting temperature of the water. Other additive can include carbon fibers, glass fibers and the like that will strengthen the ice when it forms. It will be understood that the term "water" as used in this disclosure is intended to include both pure water and water with such additives. The water in the water reservoir 48 is passed through both a filter 50 and a pre-cooler 52. The pre-cooler 52 is a refrigeration unit that cools the water to preferably to within a few degrees of its freezing point. The filtered and cooled water is supplied to the dispensing heads 14 using flexible tubing 54 that enables the array 12 of dispensing heads 14 to move.

Figure 4:
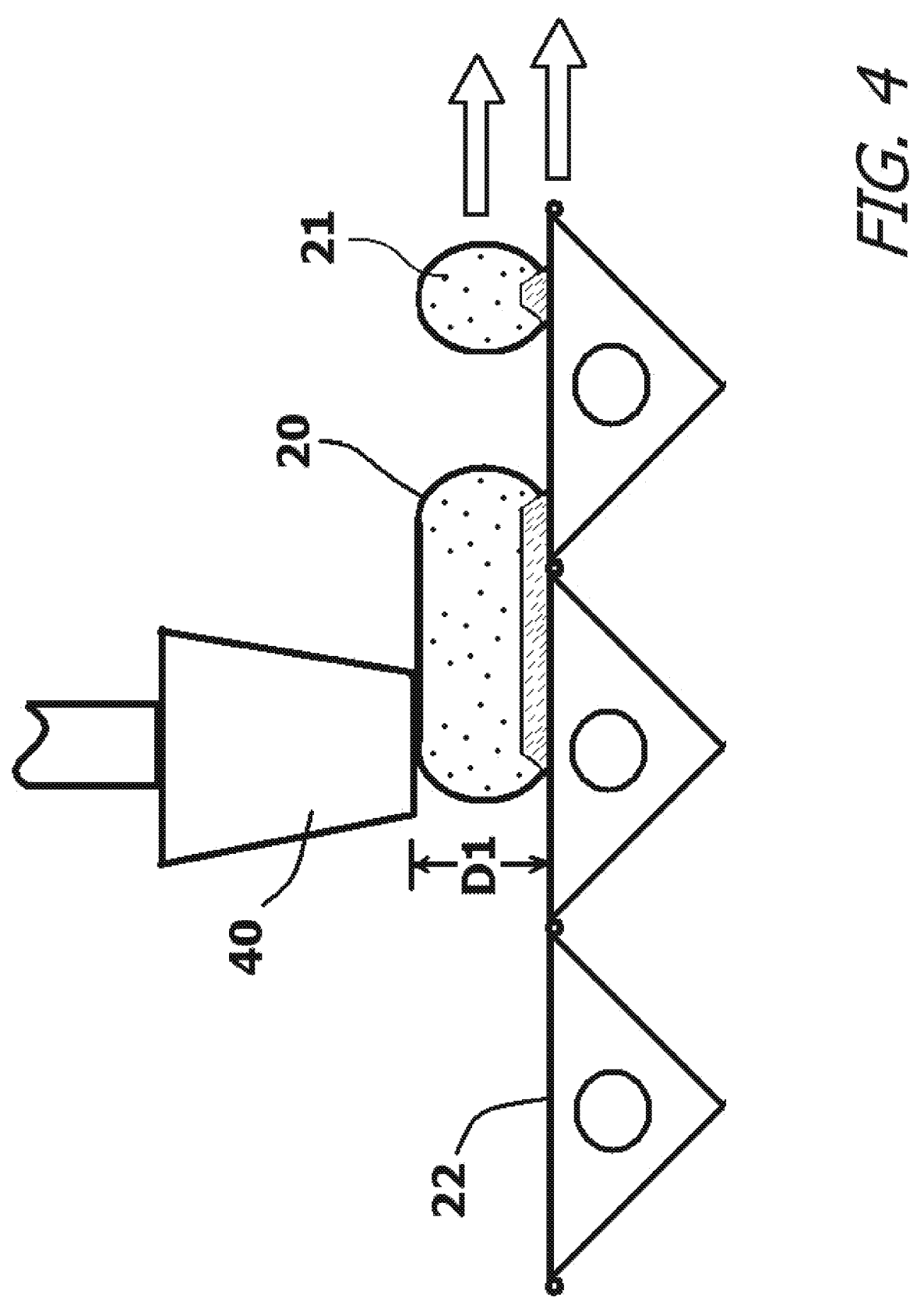
FIG. 4 is an enlarged view showing the transfer of bands of water from a dispensing head to a transfer surface.

Referring to FIG. 4 in conjunction with FIG. 3, it can be seen that each nozzle 40 is located a distance D1 from the transfer surface 22. The distance D1 is smaller than the size of the water droplets 21 produced by each nozzle 40. As a result, when a water droplet 21 begins to form, that water droplet touches the transfer surface 22 and begins to form a band of water 20. The band of water 20 begins freeze to the transfer surface 22 before each water droplet 21 completely separates from the nozzle 40. As such, the bands of water 20 can be precisely placed onto the transfer surface 22 by the nozzles 40. There is no spray, dripping, or movement of the bands of water 20 on the transfer surface 22. Rather, each band of water 20 has a precisely controlled length and is placed at a specific position. The band of water 20 remains in that position and hardens to a band of ice. The resolution of the 3D ice printing is determined by the size and density of the bands of water 20 on the transfer surface 22. The finest resolution size is the same as the size of a single water droplet 21.

Figure 5:
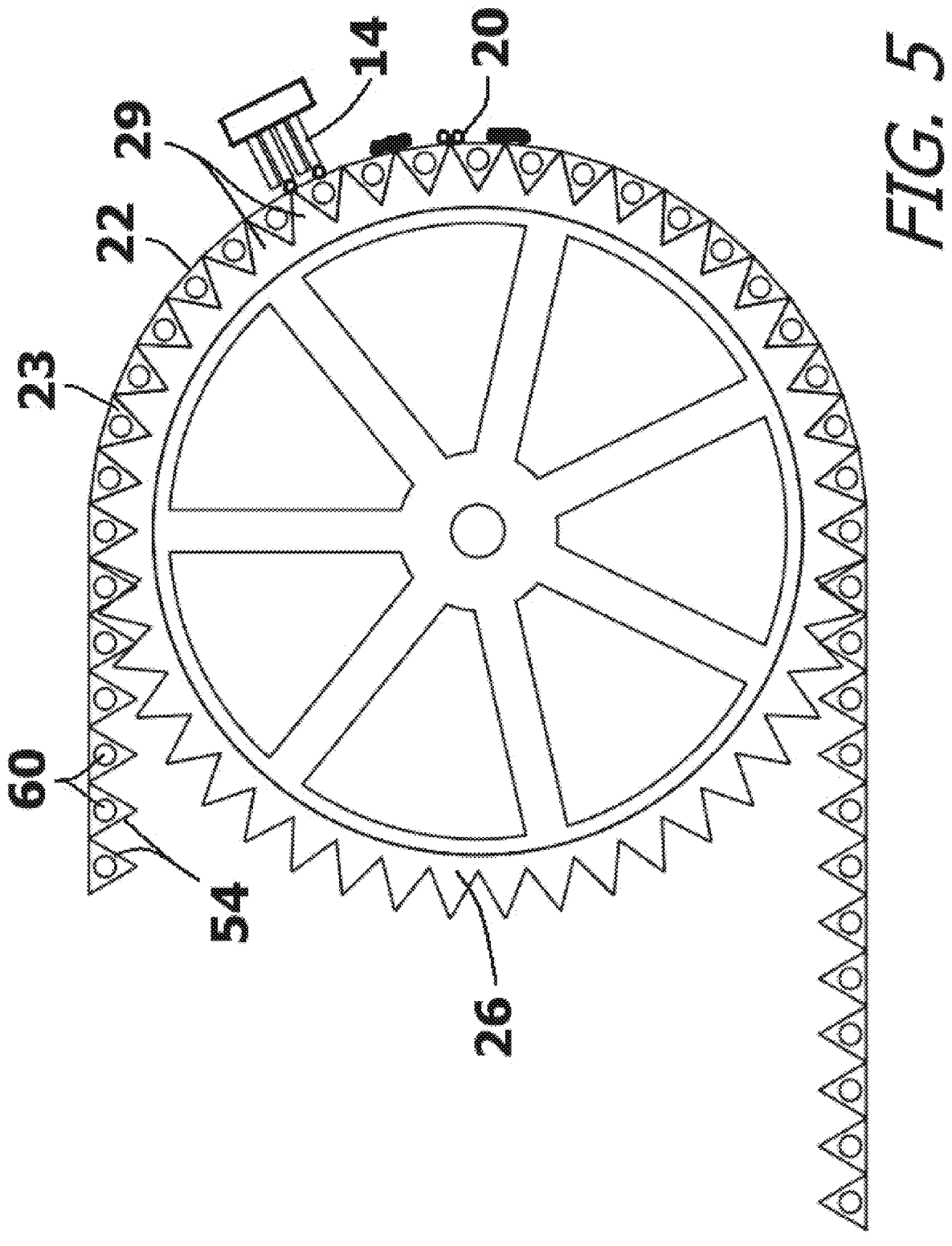
FIG. 5 is an enlarged view of the transfer track showing details of the track segments.

Referring to FIG. 5, it can be seen that the transfer track 23 is comprised of a plurality of interconnected track segments 54. Each track segment 54 has a flat transfer surface 22 that faces the dispensing heads 14 as the transfer track 23 moves past the dispensing heads 14. The transfer track 23 is shown rotating in a continuous loop around two sprocketed support rollers 26, 28. One or both of the support rollers 26, 28 are rotated by motors that are selectively operated by the programmable controller 18. The support roller 26 that supports the transfer track 23 under the dispensing heads 14 has sprocket teeth 29. The sprocket teeth 29 fill the gaps between the segments 54 of the transfer track 23 as the transfer track 23 moves by the dispensing heads 14. The presence of the sprocket teeth fill the gaps and seams in the transfer track 23, therein preventing water from passing through the transfer track 23.

Each track segment 54 is made of a material that is highly heat conductive. Within some track segments 54, and preferably each track segment 54, is a thermocouple 58 and a cooling element 60. The thermocouple 58 is connected to the programmable controller 18 and monitors the exact temperature of the track segment 54. The cooling element 60 selectively cools the track segment 54 when needed.

Figure 6:
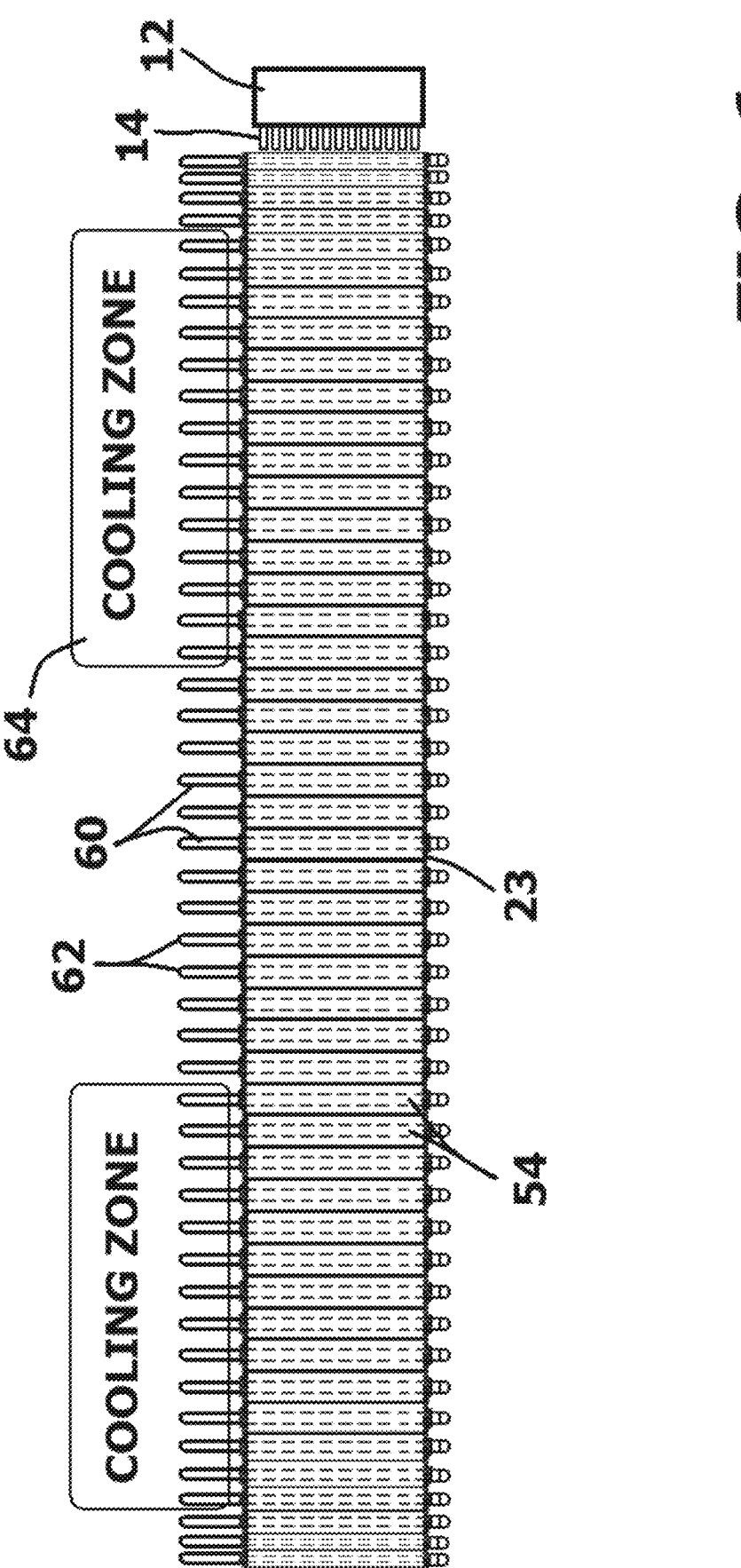
FIG. 6 shows an exemplary embodiment for actively cooling the transfer track of FIG. 5.

The cooling element 60 can be an electronic element, such as a Peltier element. Alternatively, the cooling element 60 can be a segment of tubing that passes into the track segment, wherein coolant flows through the tubing. The track segments 54 form the transfer track 23, which rotates around the support rollers 26, 28. Thus, the use of wires and tubing can complicate the selective cooling of the track segments 54. Additionally, if pure water is printed, the water can be supercooled onto the transfer track 23. Once in contact with the transfer track 23 an electrical charge can be passed through the transfer track 23 to initiate ice crystallization. Referring to FIG. 6 in conjunction with FIG. 5, an alternate preferred method of cooling each track segment 54 is shown where the cooling element 60 is a heat pipe 62 that extends from each track segment 54. The heat pipe 62 can pass through one or more cooling zones 64 surrounding the transfer track 23. The cooling zones 64 are actively cooled. In this manner, heat can be removed from the track segments 54 without inhibiting the rotational movements of the transfer track 23. If the thermocouple 58 detects that a track segment 54 is becoming too warm, one or more of the cooling zones 64 are activated. The heat pipe 62 absorbs heat from the track segments 54 and passes that heat to the cooling zones 64. In this manner, the temperature of the track segments 54 can be maintained at or near zero degrees Celsius.

Figure 7:
FIG. 7 illustrates a starting stage of a band of water transferring from a transfer surface to the object being printed.
Figure 8:
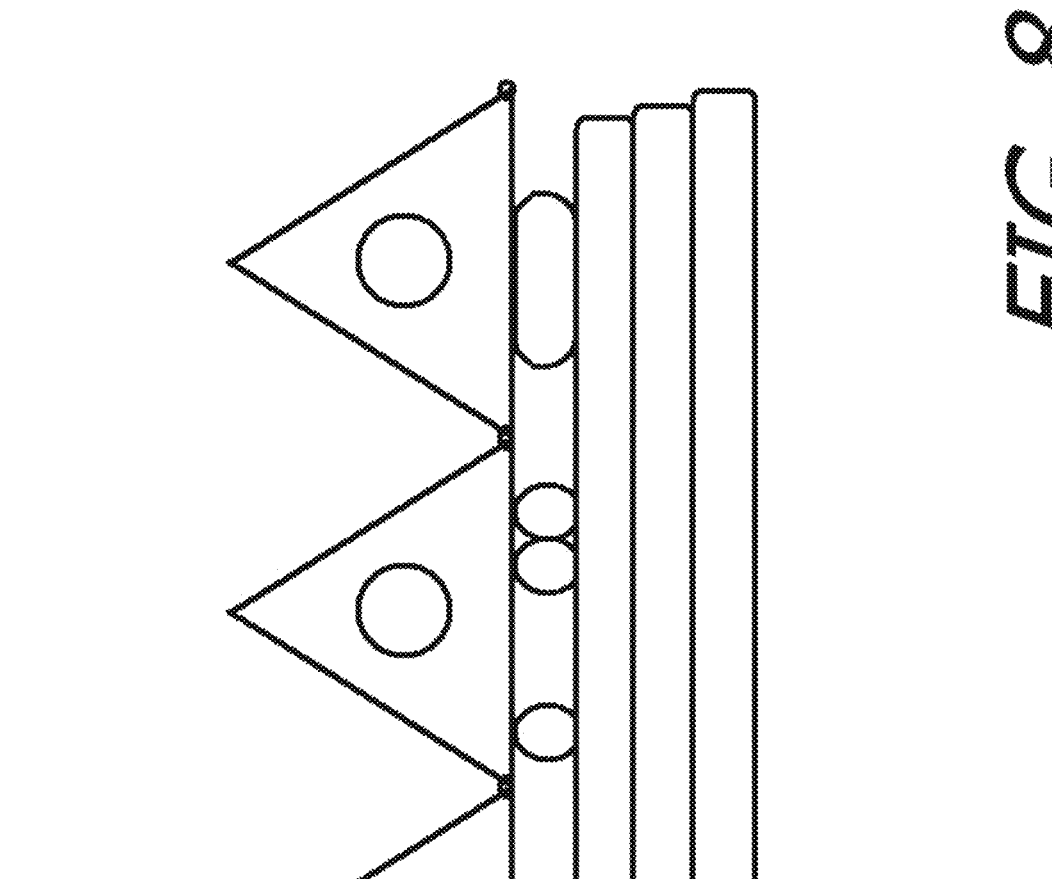
FIG. 8 illustrates a middle stage of a band of water transferring from a transfer surface to the object being printed.
Figure 8:
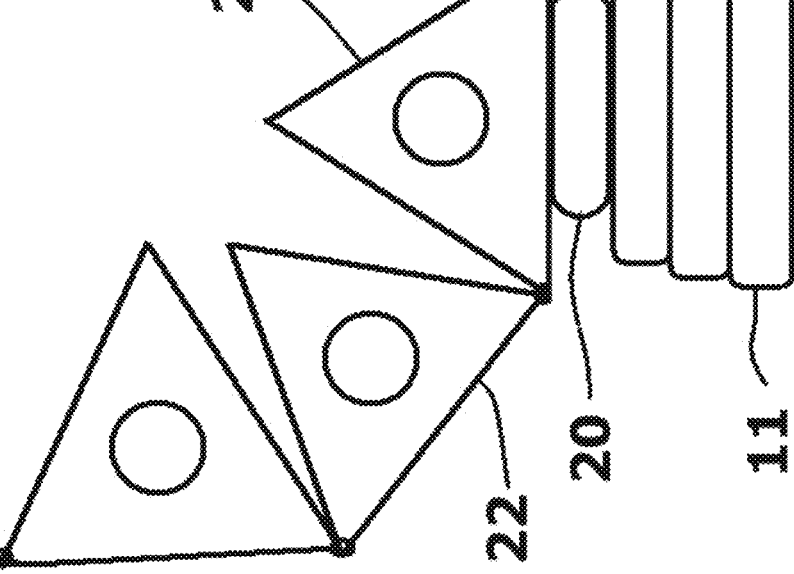
Figure 9:
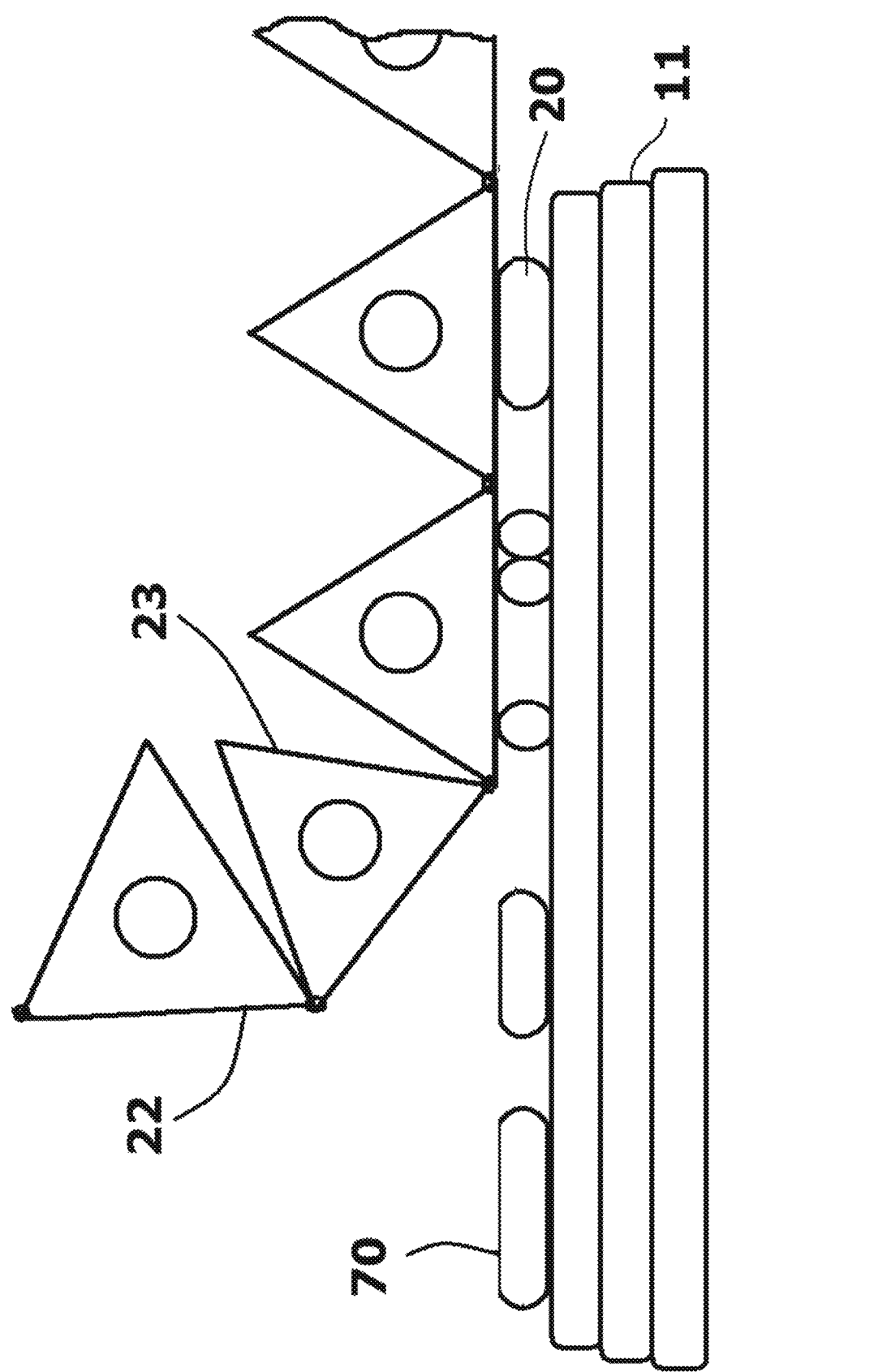
FIG. 9 illustrates a last stage of a band of water transferring from a transfer surface to the object being printed.

Referring to FIG. 7, FIG. 8, and FIG. 9, it can be seen that the nozzles 40 transfer bands of water 20 to the transfer surface 22 of the track segments 54. The bands of water 20 adhere to the transfer surface 22 by partially freezing. However, the transfer surface 22 is not cold enough to instantly freeze the bands of water 20 solid. Rather, the bands of water 20 take a period of time to freeze. This period of time is controllable and is preferably between 1 second and 5 seconds. During this time, the bands of water 20 lose their latent heat of fusion as they transition from a liquid to a solid.

During the period of water-to-ice transition, the transfer track 23 rotates to invert the bands of water 20. Simultaneously, the x-y-x positioning system 24 moves the semi-frozen bands of water 20 into the exact position above the 3D object 11 where the bands of water 20 are to be deposited. The x-y-z positioning system 24 then brings the bands of water 20 into contact with the 3D object 11. Once in contact with the 3D object 11, the bands of water 20 completely solidify into ice and forms an ice band 70 that adds to the mass of the 3D object 11. The ice band 70 can be very small for high resolution or very long for large rapid building.

Once the band of water 20 freezes to the 3D object 11, the resulting ice band 70 is frozen to both the transfer surface 22 and the 3D object 11. To separate the ice band 70 from the 3D object 11, the transfer track 23 rotates in direction of arrow 66. As the transfer track 23 rotates, the x-y-z positioning system 24 moves the transfer track 23 so there is no relative lateral movements between the transfer track 23 and the 3D object 11. Eventually, the transfer surface 22 rotates away from the 3D object 11. This creates a shear force that separates the ice band 70 from the transfer surface 22, therein leaving the ice band 70 on the 3D object 11. The process is repeated until the 3D object 11 is built up layer by layer.

Figure 10:
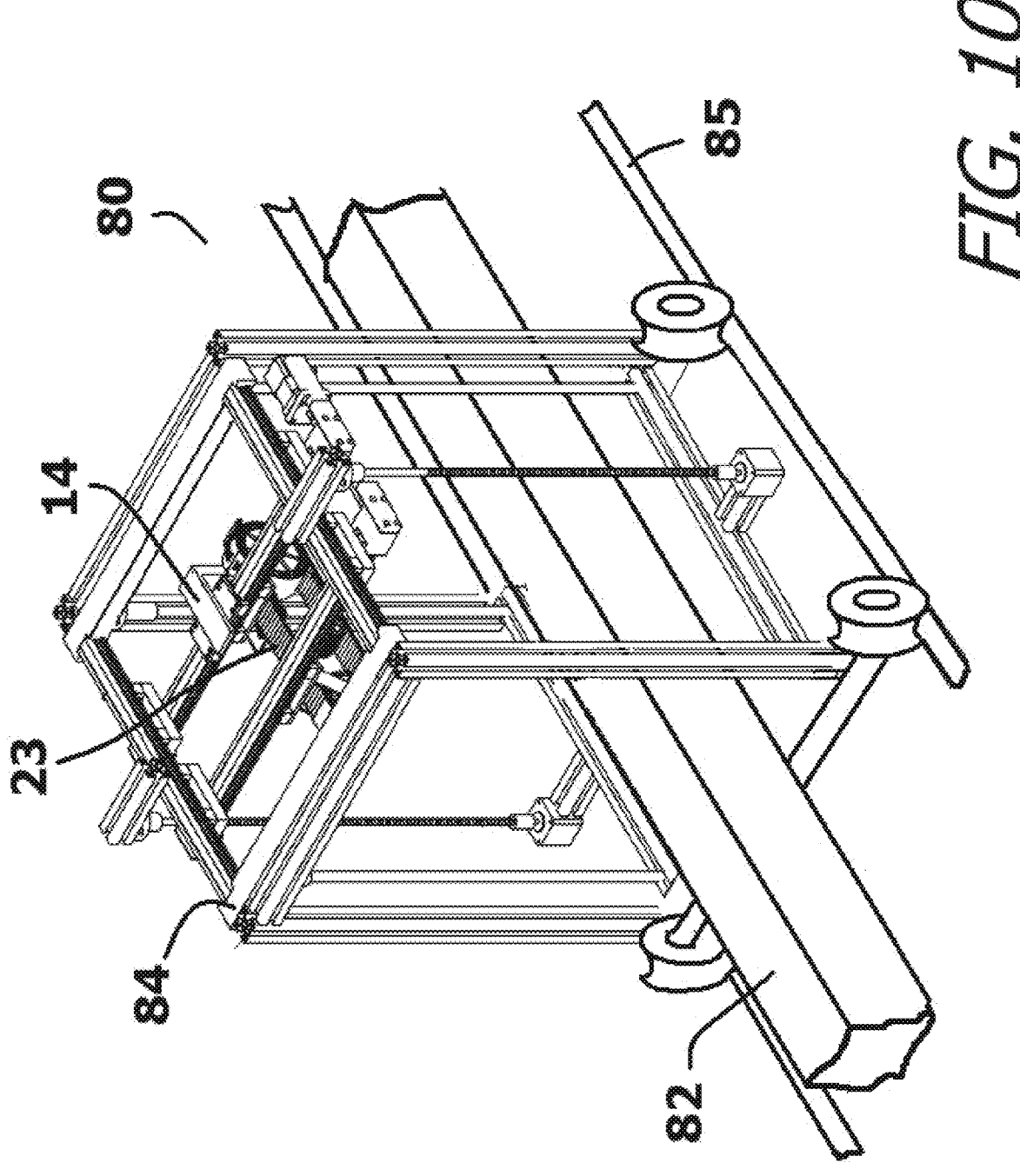
FIG. 10 shows an alternate embodiment of the present invention where the x-y-z positioning system includes rails.

In the previous embodiment, ice bands 70 are deposited with high precision to generate a 3D object 11 that has a high resolution. The same system can also be modified to rapidly produce much larger 3D structures at lower resolutions. Referring to FIG. 10, a 3D ice printing system 80 is shown for making a construction element 82, such as a wall. In this embodiment an x-y-z positioning system 24 is set onto tracks 84 that follow the shape of the wall being built. The transfer track 23 and the array 12 of dispensing heads 14 is the same as has been previously described. As such, the same reference numbers are used to identify the same parts. In addition, the distance set between the transfer surface 23 and the dispensing heads 14 is set for its maximum, which is the diameter of just less than one water drop, which contains approximately 0.05 ml of water. This can create an ice band of up to 2 mm thick. By rapidly moving the transfer track 23 and the array 12 of dispensing heads 14 back and forth across the wall, the wall can be quickly constructed at up to 2 mm in height per pass.

Figure 11:
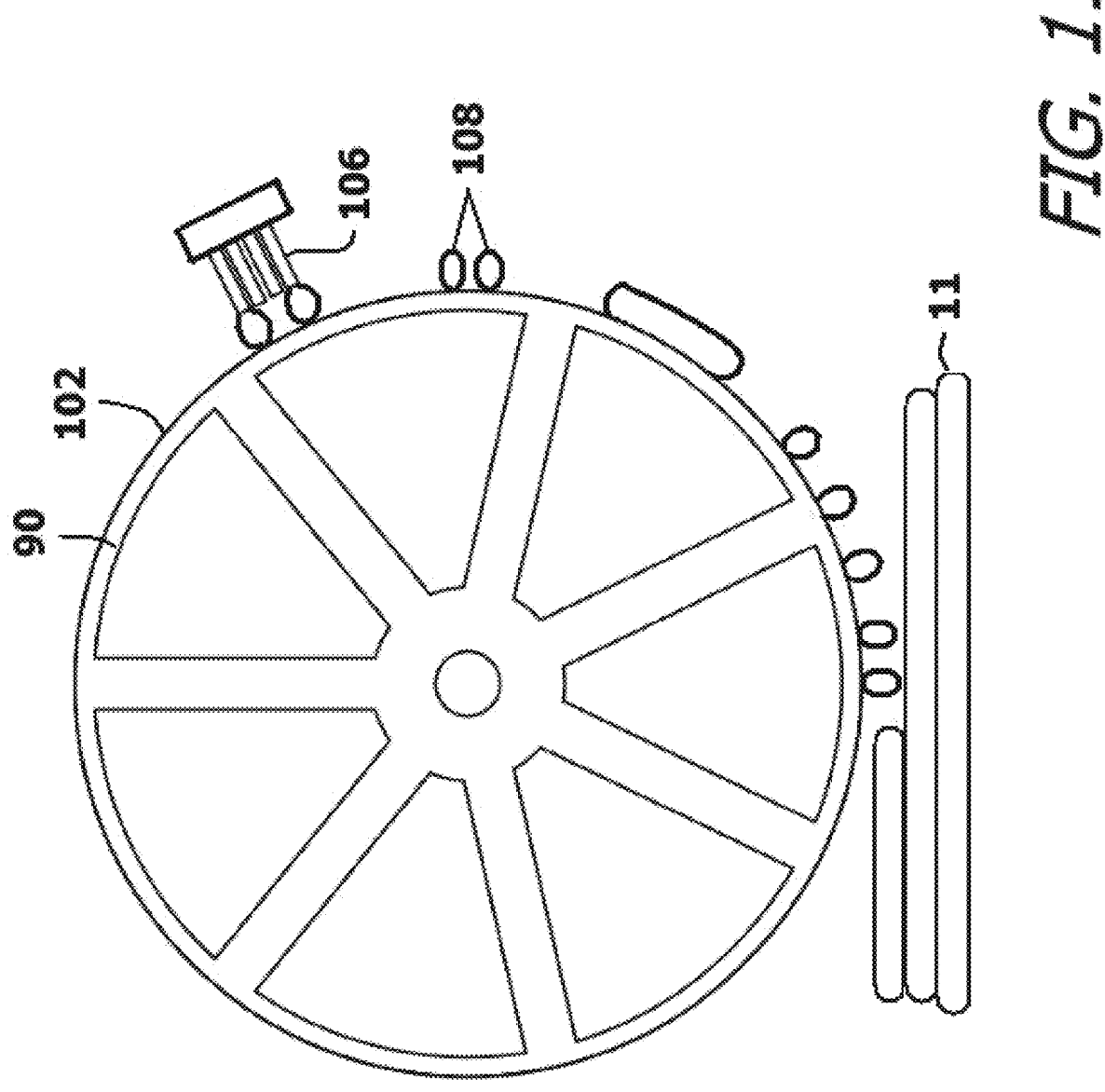
FIG. 11 shows another alternate embodiment of the present invention where a drum is used in place of a transfer track.

In the previous embodiments, a transfer track is used to move the bands of water away from the dispensing heads. It should be understood that the use of a transfer track is exemplary and what is of importance is that the water bands contact a cooled contact surface that can reorient the bands of water to face the object being formed. Referring to FIG. 11, it can be seen that the use of a transfer track can be replaced with an actively cooled cylindrical drum 90. The cylindrical drum 90 is internally cooled and contains an exterior surface that serves as the transfer surface 102. An array 104 of dispensing heads 106 produce bands of water 108 that begin to freeze and adhere to the transfer surface 102. The cylindrical drum 90 rotates to move the bands of water 108 away from the dispensing heads 106 and toward the object being formed 11, before the bands of water 108 freeze solid.

The cylindrical drum 90 is moved by an x-y-z positioning system 110 relative to the object being formed. The bands of water 108 are brought into precision contact with the object 11, wherein the bands of water 108 freeze into bands of ice and adhere to the object 11. The cylindrical drum 90 then rolls to detach the bands of ice from the cylindrical drum 90. It should also be understood that the transfer surface can be a belt that passes around one or more actively cooled drums, wherein the bands of water can be deposited onto the belt rather than directly onto the drum.

It will be understood that the embodiments of the present invention that are illustrated and described are merely exemplary and that a person skilled in the art can make many variations to those embodiments. All such embodiments are intended to be included within the scope of the present invention as defined by the appended claims.

What is claimed is:

1. A method of 3D printing an object from ice, comprising the steps of:
   providing a dispensing head that selectively produces a droplet of water;
   contacting said droplet of water to a cooled transfer surface, wherein said droplet of water partially freezes upon contact with said transfer surface and adheres to said transfer surface;

manipulating said transfer surface to precisely position said droplet of water on a target surface, wherein said droplet of water freezes into an ice band while in contact with said target surface therein adding said ice band to said target surface.

2. The method according to claim 1, further including rotating said transfer surface away from said ice band to separate said ice band from said transfer surface.

3. The method according to claim 2, wherein said transfer surface is a track element that rotates around a continuous path.

4. The method according to claim 3, wherein said transfer surface is part of a cylindrical drum that can selectively rotate.

5. The method according to claim 1, wherein said dispensing head has a nozzle where said droplet of water forms, wherein providing said dispensing head includes positioning said nozzle a first distance from said transfer surface, wherein said droplet of water can contact both said nozzle and said transfer surface simultaneously.

6. The method according to claim 5, wherein manipulating said transfer surface includes moving said transfer surface relative to said dispensing head to move said droplet of water away from said transfer surface.

7. The method according to claim 6, wherein manipulating said transfer surface includes moving said transfer surface and said dispensing head as a unit relative to said target surface.

8. The method according to claim 1, wherein said transfer surface is metal and is actively cooled to a freezing temperature for said ice.

9. The method according to claim 8, wherein said droplet of water is sourced from a water supply, and wherein said method includes a precooling system for cooling said water supply to within five degrees Celsius of said freezing temperature.

* * * * *